United States Patent
Zhang et al.

(10) Patent No.: US 12,461,002 B1
(45) Date of Patent: Nov. 4, 2025

(54) METHOD, DEVICE, STORAGE MEDIUM AND EQUIPMENT FOR OBSERVING HYDROGEN RESERVOIR COMPONENTS IN SOIL

(71) Applicant: Northwest Institute of Eco-Environment and Resources, Chinese Academy of Sciences, Lanzhou (CN)

(72) Inventors: Yongyong Zhang, Lanzhou (CN); Wenzhi Zhao, Lanzhou (CN); Zhibin He, Lanzhou (CN); Rong Yang, Lanzhou (CN)

(73) Assignee: Northwest Institute of Eco-Environment and Resources, Chinese Academy of Sciences, Lanzhou (CN)

( * ) Notice: Subject to any disclaimer, the term of this patent is extended or adjusted under 35 U.S.C. 154(b) by 0 days.

(21) Appl. No.: 19/170,520

(22) Filed: Apr. 4, 2025

(30) Foreign Application Priority Data

Jun. 27, 2024 (CN) .......................... 202410849920.4

(51) Int. Cl.
 *G01N 5/04* (2006.01)
 *G01N 33/24* (2006.01)

(52) U.S. Cl.
 CPC ............ *G01N 5/045* (2013.01); *G01N 33/246* (2013.01)

(58) Field of Classification Search
 CPC ............ G01N 5/045; G01N 5/04; G01N 5/00; G01N 33/246; G01N 33/24; G01N 33/00
 See application file for complete search history.

(56) References Cited

U.S. PATENT DOCUMENTS

2011/0003936 A1* 1/2011 Chen ...................... C09K 17/18
 536/63
2021/0341442 A1* 11/2021 Petroski ............... G01N 1/4055
 (Continued)

FOREIGN PATENT DOCUMENTS

| CN | 104749340 A | 7/2015 |
|----|-------------|--------|
| CN | 108982407 A | 12/2018 |

(Continued)

OTHER PUBLICATIONS

Chinese Office Action dated Dec. 10, 2024 in connection with Chinese Application No. 202410849920.4.

(Continued)

*Primary Examiner* — Mohamed Charioui
(74) *Attorney, Agent, or Firm* — Wolf, Greenfield & Sacks, P.C.

(57) ABSTRACT

A method, a device, a storage medium and an equipment for observing hydrogen reservoir components in soil are provided by the present disclosure, including: obtaining the hydrogen components of soil pore water, the hydrogen components of organic matter, and the hydrogen components of lattice water corresponding to each sample; and obtaining the total hydrogen reservoir components of the target sample plot based on the hydrogen components of soil pore water, the hydrogen components of organic matter, and the hydrogen components of lattice water corresponding to the samples. The target sample plot is provided with a preset number of sampling soil profile points, each of the sampling soil profile points corresponds to n samples, and the sampling depth interval between any two adjacent samples in the same sampling soil profile point is consistent, so that the hydrogen reservoir components in the target sample plot can be accurately obtained.

4 Claims, 1 Drawing Sheet

--- obtaining hydrogen components of soil pore water, hydrogen components of organic matter, and hydrogen components of lattice water corresponding to each sample — S110 obtaining total hydrogen reservoir components of a target sample plot based on the hydrogen components of soil pore water, the hydrogen components of organic matter and the hydrogen components of lattice water corresponding to the samples — S120

(56) References Cited

U.S. PATENT DOCUMENTS

2022/0241830 A1* 8/2022 Stoin .................. C02F 1/722
2024/0337642 A1* 10/2024 Conway .............. G01T 7/005

FOREIGN PATENT DOCUMENTS

| CN | 116046809 | A | 5/2023 |
|----|-----------|---|--------|
| CN | 117990557 | A | 5/2024 |
| RU | 2010132816 | A | 2/2012 |

OTHER PUBLICATIONS

Li et al., Rational Sampling Numbers of Soil Moisture Monitoring for Cotton with Film Mulched Drip Irrigation Systems. Journal of Irrigation and Drainage. Feb. 2011;30:46-48. 3 pages.

* cited by examiner

METHOD, DEVICE, STORAGE MEDIUM AND EQUIPMENT FOR OBSERVING HYDROGEN RESERVOIR COMPONENTS IN SOIL

CROSS-REFERENCE TO RELATED APPLICATION

The present disclosure claims priority to Chinese patent Application No. 2024108499204, filed with the Chinese Patent Office on Jun. 27, 2024, entitled "METHOD, DEVICE, STORAGE MEDIUM AND EQUIPMENT FOR OBSERVING HYDROGEN RESERVOIR COMPONENTS IN SOIL", the entire contents of which are incorporated herein by reference.

TECHNICAL FIELD

The present disclosure relates to the field of surveying, in particular to a method, a device, a storage medium and an equipment for observing hydrogen reservoir components in soil.

BACKGROUND ART

Hydrogen reservoir in soil is the basis for the survival of terrestrial vegetation. It has been found that the weathered debris of soil can store a certain amount of water, which can be absorbed and utilized by plants, and the water absorbed by plants comes from the weathered debris in the deep soil, especially under drought conditions. It was even found that the weathered debris in soil provides 70% of the available water for plants. Therefore, the water stored in the weathered debris is an important source of water for the plants to resist drought in the dry season. In some regional studies, it has been found that the water stored in the soil parent layer in the lower part of the slope is also a major source of runoff recharge. Seasonal dry and wet changes of the moisture of weathered debris in soil affect the distribution of surface vegetation and the process of carbon and water cycle. Especially limited by observation technology, the data of hydrogen reservoir components and water storage capacity of weathered debris in soil are very scarce at large regional scales. Therefore, it is necessary to observe the components of hydrogen reservoir in soil.

SUMMARY

The objective of the present disclosure is to provide a method, a device, a storage medium and an equipment for observing hydrogen reservoir components in soil, so as to at least partially solve the above problems.

In order to achieve the above objective, the technical solution adopted by the example of the present disclosure is as follows.

In the first aspect, a method for observing hydrogen reservoir components in soil is provided by an example of the present disclosure, which includes:

obtaining the hydrogen components of soil pore water, the hydrogen components of organic matter, and the hydrogen components of lattice water corresponding to each sample; and based on the hydrogen components of soil pore water, the hydrogen components of organic matter and the hydrogen components of lattice water corresponding to the samples, obtaining the total hydrogen reservoir components of the target sample plot, wherein the target sample plot is provided with a preset number of sampling soil profile points, each of the sampling soil profile points corresponds to n samples, and the sampling depth interval between any two adjacent samples in the same sampling soil profile point is consistent.

In the second aspect, a device for observing hydrogen reservoir components in soil is provided by an example of the present disclosure, which includes:

a first processing unit, configured to obtain the hydrogen components of soil pore water, the hydrogen components of organic matter and the hydrogen components of lattice water corresponding to each sample; and a second processing unit, configured to obtain the total hydrogen reservoir components of the target sample plot based on the hydrogen components of soil pore water, the hydrogen components of organic matter and the hydrogen components of lattice water corresponding to the samples, wherein the target sample plot is provided with a preset number of sampling soil profile points, each of the sampling soil profile points corresponds to n samples, and the sampling depth interval between any two adjacent samples in the same sampling soil profile point is consistent.

In the third aspect, a storage medium is provided by an example of the present disclosure, on which a computer program is stored, where when the computer program is executed by a processor, the foregoing method is implemented.

In the fourth aspect, an electronic equipment is provided by an example of the present disclosure, which includes a processor and a memory, and the memory is configured for storing one or more programs. When the one or more programs are executed by the processor, the foregoing method is implemented.

Compared with the prior art, the method, device, storage medium and equipment for observing hydrogen reservoir components in soil are provided by the example of the present disclosure, including: obtaining the hydrogen components of soil pore water, the hydrogen components of organic matter, and the hydrogen components of lattice water corresponding to each sample; and obtaining the total hydrogen reservoir components of the target sample plot based on the hydrogen components of soil pore water, the hydrogen components of organic matter, and the hydrogen components of lattice water corresponding to the samples. The target sample plot is provided with a preset number of sampling soil profile points, each of the sampling soil profile points corresponds to n samples, and the sampling depth interval between any two adjacent samples in the same sampling soil profile point is consistent, so that the hydrogen reservoir components in the target sample plot can be accurately obtained.

In order to make the above objectives, features and advantages of the present disclosure more obvious and easy to understand, the following is a detailed description of the preferred example with the attached drawings.

BRIEF DESCRIPTION OF THE DRAWINGS

In order to more clearly illustrate the technical solutions of examples of the present disclosure, the drawing to be used in examples will be briefly introduced below. It should be understood that the following drawing only shows some examples of the present disclosure, so they should not be regarded as limiting the scope. For those skilled in the art, other drawings can be obtained according to these drawing without inventive efforts.

Figure 1:
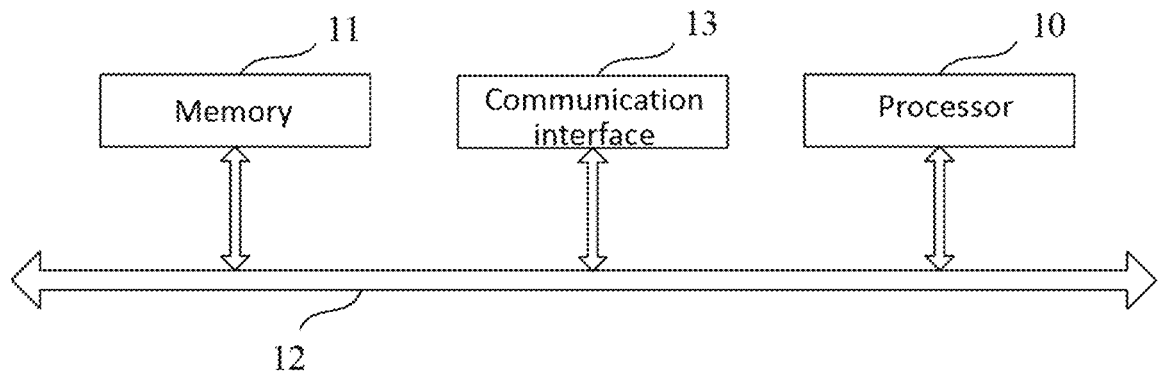
FIG. 1 is a schematic structural diagram of an electronic equipment provided by the present disclosure.

In the figures: 10—processor; 11—memory; 12—bus; 13—communication interface; 201—first processing unit; 202—second processing unit.

DETAILED DESCRIPTION OF EMBODIMENTS

In order to make the objectives, technical solutions and advantages of the examples of the present disclosure more clear, the technical solution in the example of the present disclosure will be described clearly and completely with the attached drawings. Obviously, the described example is a part of the examples of the present disclosure, but not the whole examples. The components of the examples of the present disclosure, which are described and illustrated in the drawings herein, generally can be arranged and designed in various configurations.

Therefore, the following detailed description of the examples of the present disclosure provided in the drawings is not intended to limit the scope claimed in the present disclosure but only represents selected examples of the present disclosure. Based on the examples in the present disclosure, all other examples obtained by those skilled in the art, without inventive work, belong to the protection scope of the present disclosure.

It should be noted that similar symbols and letters indicate similar items in the following drawings, so once an item is defined in one drawing, it does not need to be further defined and explained in subsequent drawings. Meanwhile, in the description of the present disclosure, the terms such as "first" and "second" are used to distinguish descriptions only, and cannot be understood as indicating or implying relative importance.

It should be noted that, in the context, the relationship terms such as "first" and "second" are used only to distinguish one entity or operation from another entity or operation, without necessarily requiring or implying any such actual relationship or order between those entities or operations. Moreover, the terms "including", "comprising" or any other variation thereof are intended to cover non-exclusive inclusion, so that a process, a method, an item or an equipment including a series of elements includes not only those elements, but also other elements not explicitly listed or elements inherent to such process, method, item or equipment. In the absence of further limitations, the inclusion of an element specified by the phrase "comprising/including a . . . " does not exclude the presence of additional identical elements in the process, method, item, or equipment that includes the specified element.

In the description of the present disclosure, it should be noted that the terms such as "upper", "lower", "inside" and "outside" indicate orientations or positional relationships based on those shown in the accompanying drawings, or the orientations or positional relationship that the product of the present disclosure is usually placed in use. They are intended only for the purpose of facilitating the description of the present disclosure and to simplify the description and are not indicative of, or suggestive of, that the referred device or components must have a particular orientation, or be constructed and operated with a particular orientation, and therefore are not to be understood as limitations of the present disclosure.

In the description of the present disclosure, unless otherwise expressly stated and limited, it should also be noted that the terms "provide" and "connect" should be broadly understood. For example, they can be fixed connection, detachable connection, or integrated connection; it can be a mechanical connection or an electrical connection; it can be directly connected, or be indirectly connected through an intermediate medium, and further can be communication inside two elements. For those skilled in the art, the specific meanings of the above terms in the present disclosure can be understood in specific circumstances.

The embodiments of the present disclosure are described in detail below with reference to the drawings. In the case of no conflict, the following examples and features in the example can be combined with each other.

Hydrogen reservoir components in soil include the hydrogen components of soil pore water, the hydrogen components of organic matter and the hydrogen components of lattice water in soil. At the regional or larger scale, there are still methodological challenges in the observation and research of hydrogen components in soil, which limits the understanding of soil hydrological processes in mountainous regions. Research on the hydrogen reservoir components in soil at regional or pixel scales has always been a challenging issue in the field of soil hydrology. In order to solve the observation problem of hydrogen reservoir components, the example of the present disclosure provides a method for observing hydrogen reservoir components in soil, which can accurately obtain the hydrogen reservoir components in soil at regional or pixel scales.

Electronic equipment is provided in the example of the present disclosure, which can be mobile phone equipment, computer equipment or server equipment. Referring to FIG. 1, FIG. 1 is the structural schematic diagram of electronic equipment. The electronic equipment includes a processor 10, a memory 11 and a bus 12. The processor 10 and the memory 11 are connected through the bus 12, and the processor 10 is configured for executing the executable modules stored in the memory 11, such as computer programs.

The processor 10 can be an integrated circuit chip with signal processing capabilities. In the process of implementation, each step of the method for observing hydrogen reservoir components in soil can be accomplished by integrated logic circuits of hardware or instructions in the form of software in the processor 10. The above processor 10 can be a general-purpose processor, including a Central Processing Unit (referred to as CPU), a Network Processor (referred to as NP), etc., it can further be a Digital Signal Processor (referred to as DSP), an Application Specific Integrated Circuit (referred to as ASIC), a Field-Programmable Gate Array (referred to as FPGA) or other programmable logic devices, discrete gate or transistor logic devices, and discrete hardware components.

The memory 11 can include a high-speed Random Access Memory (RAM), or it can further include a non-volatile memory, such as at least one disk memory.

The bus 12 can be an Industry Standard Architecture (ISA) bus, a Peripheral Component Interconnect (PCI) bus, or an Extended Industry Standard Architecture (EISA) bus, etc. The bus is represented in FIG. 1 by only one bi-directional arrow, but does not indicate that there is only one bus 12 or one type of bus 12.

The memory 11 is configured to store programs, such as programs corresponding to the device for observing hydrogen reservoir components in soil. The device for observing hydrogen reservoir components in soil includes at least one software function module which can be stored in the memory 11 in the form of software or firmware, or can be solidified in the operating system (OS) of electronic equipment. After receiving the execution instruction, the processor 10 executes the program to realize the method for observing hydrogen reservoir components in soil.

Possibly, the electronic equipment provided by the example of the present disclosure further includes a communication interface 13, and the communication interface 13 is connected with the processor 10 through a bus.

It should be understood that the structure shown in FIG. 1 is only a schematic structural view of a part of an electronic equipment, and the electronic equipment can also include more or less components than that shown in FIG. 1, or have a different configuration from that shown in FIG. 1. Each component shown in FIG. 1 can be implemented in hardware, software or a combination thereof.

Figure 2:
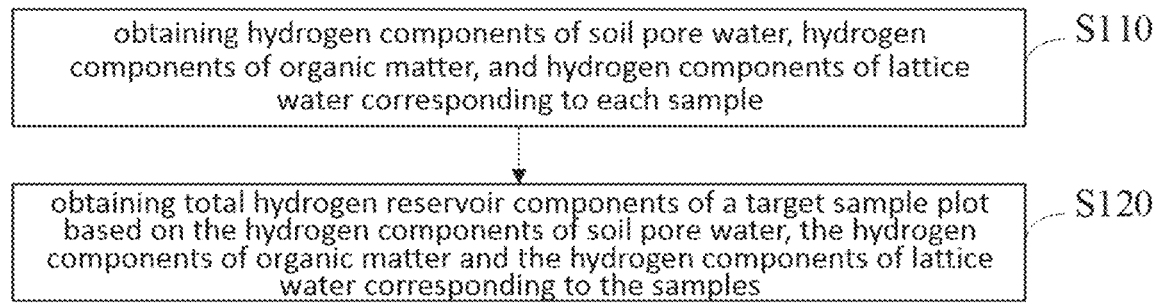
FIG. 2 is a schematic flow diagram of the method for observing hydrogen reservoir components in soil provided by the present disclosure.

The method for observing hydrogen reservoir components in soil provided by the example of the present disclosure can be applied to, but not limited to, the electronic equipment shown in FIG. 1. Referring to FIG. 2 for the specific process, the methods for observing hydrogen reservoir components in soil include S110 and S120, which are described in detail as follows.

S110: Obtaining the hydrogen components of soil pore water, the hydrogen components of organic matter, and the hydrogen components of lattice water corresponding to each sample.

The target sample plot is provided with a preset number of sampling soil profile points, each of the sampling soil profile points corresponds to n samples, and the sampling depth interval between any two adjacent samples in the same sampling soil profile point is consistent, and the sampling depth interval can be, but not limited to, 10 cm.

On the basis of FIG. 2, with respect to the contents in S110, the example of the present disclosure further provides an alternative embodiment, referring to the following. S110: The step of obtaining the hydrogen components of soil pore water, the hydrogen components of organic matter, and the hydrogen components of lattice water corresponding to each sample includes the following.

S111: Controlling the drying equipment to continuously dry the sample at a first temperature for a first preset duration, so as to obtain an initial-stage dried product.

The first temperature can be 105° C. and the first preset duration can be 24 h.

S112: Controlling the drying equipment to continuously dry the initial-stage dried product at a second temperature for a second preset duration, so as to obtain the second-stage dried product.

The second temperature can be 400° C. and the second preset duration can be 24 h.

S113: Controlling the drying equipment to continuously dry the second-stage dried product at a third temperature for a third preset duration, so as to obtain the third-stage dried product.

The third temperature can be 1000° C. and the third preset duration can be 24 h.

S114: Determining the hydrogen components of soil pore water, the hydrogen components of organic matter, and the hydrogen components of lattice water corresponding to the sample based on the mass of the sample, the mass of the initial-stage dried product, the mass of the second-stage dried product and the mass of the third-stage dried product.

The first temperature is lower than the second temperature, the second temperature is lower than the third temperature, and all samples initially have an equal mass, which can be but is not limited to 100 g.

In an alternative embodiment, in S114, the step of determining the hydrogen components of soil pore water, the hydrogen components of organic matter, and the hydrogen components of lattice water corresponding to the sample based on the mass of the sample, the mass of the initial-stage dried product, the mass of the second-stage dried product and the mass of the third-stage dried product includes the following.

S114A: Determining the hydrogen components of soil pore water according to the mass of the sample and the mass of the initial-stage dried product.

Optionally, the difference between the mass of the sample and the mass of the initial-stage dried product is divided by the mass of the initial-stage dried product, and then the result is multiplied by the first preset coefficient as the hydrogen components of the soil pore water, wherein the first preset coefficient can be, but is not limited to, 0.111.

S114B: Determining the hydrogen components of organic matter according to the mass of the initial-stage dried product, the mass of the second-stage dried product and the second preset coefficient.

Optionally, the difference between the mass of the initial-stage dried product and the mass of the second-stage dried product is divided by the mass of the initial-stage dried product, and then the result is multiplied by a second preset coefficient, so as to obtain the hydrogen components of organic matter, wherein the second preset coefficient can be, but is not limited to, 0.062.

S114C: Determining the hydrogen components of lattice water according to the mass of the second-stage dried product and the mass of the third-stage dried product.

Optionally, the difference between the mass of the second-stage dried product and the mass of the third-stage dried product is divided by the mass of the initial-stage dried product, and then the result is multiplied by a third preset coefficient as the hydrogen components of lattice water, wherein the third preset coefficient can be, but is not limited to, 0.111.

S120: Obtaining the total hydrogen reservoir components of the target sample plot based on the hydrogen components of soil pore water, the hydrogen components of organic matter and the hydrogen components of lattice water corresponding to the samples.

The target sample plot is provided with a preset number of sampling soil profile points, each of the sampling soil profile points corresponds to n samples, and the sampling depth interval between any two adjacent samples in the same sampling soil profile point is consistent.

On the basis of FIG. 2, with respect to the contents in S120, the example of the present disclosure further provides an alternative embodiment, refer to the following. S120: The step of obtaining the total hydrogen reservoir components of the target sample plot based on the hydrogen components of soil pore water, the hydrogen components of organic matter and the hydrogen components of lattice water corresponding to the samples include S121 and S122, which are described in detail as follows.

S121: Determining the comprehensive weight corresponding to the sample based on the radial distance and vertical depth corresponding to the sample.

The radial distance represents the horizontal distance between the sampling soil profile point corresponding to the sample and the center point of the target sample plot, and the vertical depth represents the depth of the sample from the ground.

Optionally, in S121, the step of determining the comprehensive weight corresponding to the sample based on the radial distance and vertical depth corresponding to the sample includes S121A, S121B and S121C, which are specifically described as follows.

S121A: Determining the radial weight of the sample based on the radial distance corresponding to the sample.

S121B: Determining the vertical weight of the sample based on the vertical depth corresponding to the sample.

S121C: Determining the comprehensive weight corresponding to the sample based on the radial weight and vertical weight of the sample.

Optionally, the formula of comprehensive weight is:

$$W_i = \frac{W_{zi} * W_{ri}}{\sum_{i=1}^{M} W_{zi} * W_{ri}}$$

$$W_{zi} = e^{-2 \times zi \div D}$$

$$W_{ri} = \begin{cases} P_1 \times e^{-P_2 \times ri} + P_3 \times e^{-P_4 \times ri}, & 0 < ri \le 50\ m \\ P_5 \times e^{-P_6 \times ri} + P_7 \times e^{-P_8 \times ri}, & 50 < ri \le 300\ m \end{cases}$$

$W_i$ represents the comprehensive weight of the i-th sample, $W_{zi}$ represents the vertical weight of the i-th sample, $W_{ri}$ represents the radial weight of the i-th sample, M represents the total number of samples, D represents the maximum of sampling depth, zi represents the vertical depth of the i-th sample, ri represents the radial distance of the i-th sample, and $P_1$, $P_2$, $P_3$, $P_4$, $P_5$, $P_6$, $P_7$ and $P_8$ are preset parameters.

S122: Obtaining the total hydrogen reservoir components of the target sample plot based on the comprehensive weights, the hydrogen components of soil pore water, the hydrogen components of organic matter and the hydrogen components of lattice water corresponding to the samples.

Optionally, the formula of the total hydrogen reservoir components of the target sample plot is:

$$\theta = \alpha + \beta + \gamma$$

$$\alpha = \sum_{i=1}^{M} W_i \times \alpha_i$$

$$\beta = \sum_{i=1}^{M} W_i \times \beta_i$$

$$\gamma = \sum_{i=1}^{M} W_i \times \gamma_i$$

$\theta$ represents the total hydrogen reservoir components of the target sample plot (corresponding to the pixel scale), $W_i$ represents the comprehensive weight of the i-th sample, $\alpha_i$ represents the hydrogen components of soil pore water of the i-th sample, $\beta_i$ represents the hydrogen components of organic matter of the i-th sample, $\gamma_i$ represents the hydrogen components of lattice water of the i-th sample, $\alpha$ represents the total hydrogen components of soil pore water of all samples, $\beta$ represents the total hydrogen components of organic matter of all samples, and $\gamma$ represents the total hydrogen components of lattice water of all samples.

It should be noted that the above $\theta$, $\alpha$, $\beta$ and $\gamma$ are all ratios (which can be percentages). After determining the total hydrogen reservoir components of the target sample plot, the mass of hydrogen reservoir in the target sample plot can be determined by combining the mass of soil in the effective depth of the target sample plot, wherein the effective depth can be the maximum depth of sampling.

In an alternative embodiment, the target sample plot is a plot with a preset length and a preset width. The length corresponding to the pixel in the target remote sensing image of the research region is the preset length, and the width corresponding to the pixel is the preset width.

After determining the total hydrogen reservoir components of the target sample plot or the mass of hydrogen reservoir in the target sample plot, the number of target pixels of the target remote sensing image that are identical to the target landscape type of the target sample plot can be counted, and based on the number of target pixels and the mass of hydrogen reservoir in the target sample plot (or the total hydrogen reservoir components of the target sample plot), the mass of hydrogen reservoir under the target landscape type in the research region can be determined.

Based on this, by counting the total hydrogen reservoir components or the mass of hydrogen reservoir in target sample plots of different landscape types, the total hydrogen reservoir components or the mass of hydrogen reservoir corresponding to the research region can be determined.

On the basis of the foregoing contents, an alternative embodiment of how to determine the target sample plots and the sampling soil profile points is further provided in the example of the present disclosure, referring to the following.

The image information corresponding to the research region is obtained, and a region of a preset length and a preset width consistent with the landscape type is selected as the target sample plot, where the preset length can be but is not limited to 200 m, the preset width can be but is not limited to 200 m, and the landscape type can be any one of a farmland type, a forest-land type, a grassland type, a desert type, and a marsh type.

In an alternative embodiment, the target sample plot can be divided into multiple sub-regions with equal area, and the center of each sub-region is taken as the sampling soil profile point.

In an alternative embodiment, the center point of the target sample plot which can represent the characteristics of the landscape type is selected as the center of the circle. Sampling soil profile points are selected at a radius of 25 m, 75 m and 175 m, including: at 25 m from the center of the circle, starting at 0° and arranging the sampling soil profile points at intervals of 60°; at 75 m from the center of the circle, starting at 450 and arranging the sampling soil profile points at intervals of 90°; and at 175 m from the center of the circle, starting at 0° and arranging the sampling soil profile points at intervals of 90°, wherein a total of 14 soil profile sampling points are selected. Alternatively, sampling soil profile points are selected at a radius of 25 m, 75 m and 175 m, including: at 25 m from the center of the circle, starting at 0° and arranging the sampling soil profile points at intervals of 60°; at 75 m from the center of the circle, starting at 0° and arranging the sampling soil profile points at intervals of 60°; and at 175 m from the center of the circle, starting at 0° and arranging the sampling soil profile points at intervals of 60°, wherein a total of 18 soil profile sampling points are selected. The concentric circle sampling manner is adopted and 14-18 soil profile sampling points are selected, thus reducing the number of sampling points arranged and improving the sampling efficiency.

At each soil profile sampling point, with the change of soil depth, soil samples are collected at intervals of 10 cm for every sampling depth, and n layers of depth are selected. The sampling depth interval between any two adjacent samples in the same sampling soil profile point remains consistent.

Figure 3:
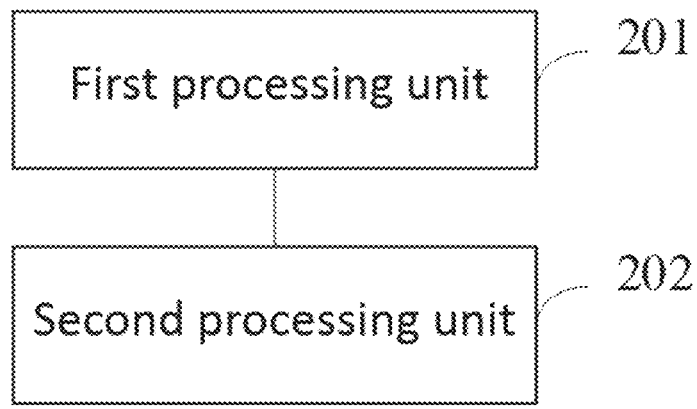
FIG. 3 is a schematic unit diagram of a device for observing hydrogen reservoir components in soil provided by the present disclosure.

Referring to FIG. 3, FIG. 3 shows a device for observing hydrogen reservoir components in soil providing by an example of the present disclosure. Optionally, the device for observing hydrogen reservoir components in soil is applied to the above-mentioned electronic equipment.

The device for observing hydrogen reservoir components in soil includes a first processing unit 201 and a second processing unit 202.

The first processing unit 201 is configured to obtain the hydrogen components of soil pore water, the hydrogen components of organic matter and the hydrogen components of lattice water corresponding to each sample.

The second processing unit 202 is configured to obtain the total hydrogen reservoir components of the target sample plot based on the hydrogen components of soil pore water, the hydrogen components of organic matter and the hydrogen components of lattice water corresponding to the samples.

The target sample plot is provided with a preset number of sampling soil profile points, each of the sampling soil profile points corresponds to n samples, and the sampling depth interval between any two adjacent samples in the same sampling soil profile point is consistent.

It should be noted that the device for observing hydrogen reservoir components in soil provided by the example can execute the method flow shown in the above method flow example to achieve corresponding technical effects. For a brief description, the corresponding contents in the above-mentioned example can be referred to for the parts not mentioned in this example.

A storage medium is further provided by an example of the present disclosure, in which computer instructions and programs are stored, and the computer instructions and programs, when read and run, execute the method for observing hydrogen reservoir components in soil of the above example. The storage medium can include a memory, a flash memory, a register, or a combination thereof.

An electronic equipment is provided in the following, which can be a mobile phone equipment, a computer equipment or a server equipment. As shown in FIG. 1, the method for observing hydrogen reservoir components in soil can be realized by the electronic equipment. Specifically, the electronic equipment includes a processor 10, a memory 11 and a bus 12. The processor 10 can be a CPU. The memory 11 is configured to store one or more programs, and when the one or more programs are executed by the processor 10, the method for observing hydrogen reservoir components in soil of the above example is executed.

To sum up, the method, device, storage medium and equipment for observing hydrogen reservoir components in soil are provided by the example of the present disclosure, including: obtaining the hydrogen components of soil pore water, the hydrogen components of organic matter, and the hydrogen components of lattice water corresponding to each sample; and obtaining the total hydrogen reservoir components of the target sample plot based on the hydrogen components of soil pore water, the hydrogen components of organic matter, and the hydrogen components of lattice water corresponding to the samples. The target sample plot is provided with a preset number of sampling soil profile points, each of the sampling soil profile points corresponds to n samples, and the sampling depth interval between any two adjacent samples in the same sampling soil profile point is consistent, so that the hydrogen reservoir components in the target sample plot can be accurately obtained. The above are only preferred examples of the present disclosure and are not intended to limit the present disclosure, and for those skilled in the art, the present disclosure may have various modifications and changes. Any modifications, equivalent substitutions and improvements made within the spirit and principles of the present disclosure shall be included in the scope of protection of the present disclosure.

It is obvious to those skilled in the art that the present disclosure is not limited to the details of the above-mentioned exemplary examples, but can be realized in other specific forms without departing from the spirit or essential characteristics of the present disclosure. Therefore, the examples should be considered in all aspects as illustrative but not restrictive, and the scope of the present disclosure is defined by the appended claims rather than the above description, so it is intended to embrace all changes that fall within the meaning and range of equivalents of the claims in the present disclosure. Any reference signs in the claims shall not be construed as limiting the claims concerned.

The invention claimed is:

1. A method for observing hydrogen reservoir components in soil, comprising:

collecting n samples from each of sampling soil profile points of a target sample plot, obtaining, by a first processing unit, hydrogen components of soil pore water, hydrogen components of organic matter, and hydrogen components of lattice water corresponding to each of the n samples; and obtaining, by a second processing unit, total hydrogen reservoir components of the target sample plot based on the hydrogen components of soil pore water, the hydrogen components of organic matter and the hydrogen components of lattice water corresponding to the n samples, wherein a sampling depth interval between any two adjacent samples in same sampling soil profile point is consistent, wherein the step of obtaining hydrogen components of soil pore water, hydrogen components of organic matter, and hydrogen components of lattice water corresponding to each of the n samples comprises:

controlling a drying equipment to continuously dry the sample at a first temperature for a first preset duration, so as to obtain an initial-stage dried product;

controlling the drying equipment to continuously dry the initial-stage dried product at a second temperature for a second preset duration, so as to obtain a second-stage dried product;

controlling the drying equipment to continuously dry the second-stage dried product at a third temperature for a third preset duration, so as to obtain a third-stage dried product; and determining the hydrogen components of soil pore water, the hydrogen components of organic matter, and the hydrogen components of lattice water corresponding to the sample based on a mass of the sample, a mass of the initial-stage dried product, a mass of the second-stage dried product and a mass of the third-stage dried product, wherein the first temperature is lower than the second temperature, and the second temperature is lower than the third temperature, wherein the step of determining the hydrogen components of soil pore water, the hydrogen components of organic matter, and the hydrogen components of lattice water corresponding to the samples based on the mass of the sample, the mass of the initial-stage dried product, the mass of the second-stage dried product and the mass of the third-stage dried product comprises:

determining the hydrogen components of soil pore water according to the mass of the sample, the mass of the initial-stage dried product and a first preset coefficient;

determining the hydrogen components of organic matter according to the mass of the initial-stage dried product, the mass of the second-stage dried product and a second preset coefficient; and determining the hydrogen components of lattice water according to the mass of the second-stage dried product, the mass of the third-stage dried product and a third preset coefficient, wherein the step of obtaining total hydrogen reservoir components of a target sample plot based on the hydrogen components of soil pore water, the hydrogen components of organic matter and the hydrogen components of lattice water corresponding to the samples comprises:

determining a comprehensive weight corresponding to a sample based on a radial distance and a vertical depth corresponding to the sample, wherein the radial distance represents a horizontal distance between a sampling soil profile point corresponding to the sample and a center point of the target sample plot, and the vertical depth represents a depth of the sample from a ground; and obtaining the total hydrogen reservoir components of the target sample plot based on the comprehensive weights, the hydrogen components of soil pore water, the hydrogen components of organic matter and the hydrogen components of lattice water corresponding to the samples, wherein the step of determining a comprehensive weight corresponding to a sample based on a radial distance and a vertical depth corresponding to the sample comprises:

determining a radial weight of the sample based on the radial distance corresponding to the sample;

determining a vertical weight of the sample based on the vertical depth corresponding to the sample; and determining the comprehensive weight corresponding to the sample based on the radial weight and the vertical weight of the sample, wherein a formula of the comprehensive weight is:

$$W_i = \frac{W_{zi} * W_{ri}}{\sum_{i=1}^{M} W_{zi} * W_{ri}}$$

$$W_{zi} = e^{-2 \times zi \div D}$$

$$W_{ri} = \begin{cases} P_1 \times e^{-P_2 \times ri} + P_3 \times e^{-P_4 \times ri}, & 0 < ri \le 50 \ m \\ P_5 \times e^{-P_6 \times ri} + P_7 \times e^{-P_8 \times ri}, & 50 < ri \le 300 \ m \end{cases}$$

where $W_i$ represents a comprehensive weight of an i-th sample, $W_{zi}$ represents a vertical weight of the i-th sample, $W_{ri}$ represents a radial weight of the i-th sample, M represents a total number of the samples, D represents a maximum of sampling depth, zi represents a vertical depth of the i-th sample, ri represents a radial distance of the i-th sample, and $P_1$, $P_2$, $P_3$, $P_4$, $P_5$, $P_6$, $P_7$ and $P_8$ are preset parameters, wherein a formula of the total hydrogen reservoir components of the target sample plot is:

$$\theta = \alpha + \beta + \gamma$$

$$\alpha = \sum_{i=1}^{M} W_i \times \alpha_i$$

$$\beta = \sum_{i=1}^{M} W_i \times \beta_i$$

$$\gamma = \sum_{i=1}^{M} W_i \times \gamma_i$$

where $\theta$ represents the total hydrogen reservoir components of the target sample plot, $W_i$ represents a comprehensive weight of an i-th sample, $\alpha_i$ represents hydrogen components of soil pore water of the i-th sample, $\beta_i$ represents hydrogen components of organic matter of the i-th sample, and $\gamma_i$ represents hydrogen components of lattice water of the i-th sample.

2. A device for observing the hydrogen reservoir components in soil, comprising:

a first processing unit, configured to obtain hydrogen components of soil pore water, hydrogen components of organic matter and hydrogen components of lattice water corresponding to each of n samples; and a second processing unit, configured to obtain a total hydrogen reservoir components of a target sample plot based on the hydrogen components of soil pore water, the hydrogen components of organic matter and the hydrogen components of lattice water corresponding to the n samples, wherein the target sample plot is provided with a preset number of sampling soil profile points, each of the sampling soil profile points corresponds to the n samples, and a sampling depth interval between any two adjacent samples in the same sampling soil profile point is consistent, wherein the step of obtaining hydrogen components of soil pore water, hydrogen components of organic matter, and hydrogen components of lattice water corresponding to each of the n samples comprises: controlling a drying equipment to continuously dry the sample at a first temperature for a first preset duration, so as to obtain an initial-stage dried product; controlling the drying equipment to continuously dry the initial-stage dried product at a second temperature for a second preset duration, so as to obtain a second-stage dried product; controlling the drying equipment to continuously dry the second-stage dried product at a third temperature for a third preset duration, so as to obtain a third-stage dried product; and determining the hydrogen components of soil pore water, the hydrogen components of organic matter, and the hydrogen components of lattice water corresponding to the sample based on a mass of the sample, a mass of the initial-stage dried product, a mass of the second-stage dried product and a mass of the third-stage dried product, wherein the first temperature is lower than the second temperature, and the second temperature is lower than the third temperature, wherein the step of determining the hydrogen components of soil pore water, the hydrogen components of organic matter, and the hydrogen components of lattice water corresponding to the samples based on the mass of the sample, the mass of the initial-stage dried product, the mass of the second-stage dried product and the mass of the third-stage dried product comprises: determining the hydrogen components of soil pore water according to the mass of the sample, the mass of the initial-stage dried product and a first preset coefficient; determining the hydrogen components of organic matter according to the mass of the initial-stage dried product, the mass of the second-stage dried product and a second preset coefficient; and determining the hydrogen components of lattice water according to the mass of the second-stage dried product, the mass of the third-stage dried product and a third preset coefficient, wherein the step of obtaining total hydrogen reservoir components of a target sample plot based on the hydrogen components of soil pore water, the hydrogen components of organic matter and the hydrogen components of lattice water corresponding to the samples comprises: determining a comprehensive weight corresponding to a sample based on a radial distance and a vertical depth corresponding to the sample, wherein the radial distance represents a horizontal distance between a sampling soil profile point corresponding to the sample and a center point of the target sample plot, and the vertical depth represents a depth of the sample from a ground; and obtaining the total hydrogen reservoir components of the target sample plot based on the comprehensive weights, the hydrogen components of soil pore water, the hydrogen components of organic matter and the hydrogen components of lattice water corresponding to the samples, wherein the step of determining a comprehensive weight corresponding to a sample based on a radial distance and a vertical depth corresponding to the sample comprises: determining a radial weight of the sample based on the radial distance corresponding to the sample; determining a vertical weight of the sample based on the vertical depth corresponding to the sample; and determining the comprehensive weight corresponding to the sample based on the radial weight and the vertical weight of the sample, wherein a formula of the comprehensive weight is:

$$W_i = \frac{W_{zi} * W_{ri}}{\sum_{i=1}^{M} W_{zi} * W_{ri}}$$

-continued
$$W_{zi} = e^{-2 \times zi \div D}$$

$$W_{ri} = \begin{cases} P_1 \times e^{-P_2 \times ri} + P_3 \times e^{-P_4 \times ri}, & 0 < ri \le 50 \ m \\ P_5 \times e^{-P_6 \times ri} + P_7 \times e^{-P_8 \times ri}, & 50 < ri \le 300 \ m \end{cases}$$

where $W_i$ represents a comprehensive weight of an i-th sample, $W_{zi}$ represents a vertical weight of the i-th sample, $W_{ri}$ represents a radial weight of the i-th sample, M represents a total number of the samples, D represents a maximum of sampling depth, zi represents a vertical depth of the i-th sample, ri represents a radial distance of the i-th sample, and $P_1$, $P_2$, $P_3$, $P_4$, $P_5$, $P_6$, $P_7$ and $P_8$ are preset parameters, wherein a formula of the total hydrogen reservoir components of the target sample plot is:

$$\theta = \alpha + \beta + \gamma$$

$$\alpha = \sum_{i=1}^{M} W_i \times \alpha_i$$

$$\beta = \sum_{i=1}^{M} W_i \times \beta_i$$

$$\gamma = \sum_{i=1}^{M} W_i \times \gamma_i$$

where θ represents the total hydrogen reservoir components of the target sample plot, $W_i$ represents a comprehensive weight of an i-th sample, $\alpha_i$ represents hydrogen components of soil pore water of the i-th sample, $\beta_i$ represents hydrogen components of organic matter of the i-th sample, and $\gamma_i$ represents hydrogen components of lattice water of the i-th sample.

3. A non-transitory computer-readable storage medium, on which a computer program is stored, wherein when the computer program is executed by a processor, the method according to claim 1 is implemented.

4. An electronic equipment, comprising: a processor and a memory, and the memory is configured for storing one or more programs, when the one or more programs are executed by the processor, the method according to claim 1 is implemented.

* * * * *